(12) United States Patent  (10) Patent No.: US 7,874,671 B2
Defranco  (45) Date of Patent: Jan. 25, 2011

(54) METHOD OF TRANSFERRING A MICRON-SCALE PATTERN ONTO AN OPTICAL ARTICLE, AND OPTICAL ARTICLE OBTAINED THEREBY

(75) Inventor: Christelle Defranco, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 258 days.

(21) Appl. No.: 12/095,966

(22) PCT Filed: Dec. 6, 2006

(86) PCT No.: PCT/FR2006/002665

§ 371 (c)(1),
(2), (4) Date: Jun. 3, 2008

(87) PCT Pub. No.: WO2007/066006

PCT Pub. Date: Jun. 14, 2007

(65) Prior Publication Data

US 2008/0316558 A1  Dec. 25, 2008

(30) Foreign Application Priority Data

Dec. 8, 2005 (FR) .................................. 05 12492

(51) Int. Cl.
G02C 7/02 (2006.01)
B41K 1/38 (2006.01)
B29C 43/32 (2006.01)

(52) U.S. Cl. .................. 351/159; 359/558; 101/327; 101/368; 264/293; 264/319; 977/887; 435/5

(58) Field of Classification Search .................. 351/41, 351/159, 166; 428/447, 423.1, 451, 452; 101/35, 154, 211, 327, 368, 382.1, 450.1; 264/81, 109, 293, 319, 328.1, 338, 496; 977/887; 72/97; 438/110, 584, 703, 735; 257/40, 257/E27.004, E27.073; 365/63; 425/126.1, 425/150, 174.1, 385; 216/44, 52, 53
See application file for complete search history.

(56) References Cited

U.S. PATENT DOCUMENTS 4,171,766 A  10/1979 Ruell
(Continued)

FOREIGN PATENT DOCUMENTS

DE  19644620  4/1998
(Continued)

OTHER PUBLICATIONS

Xia et al., "Soft Lithography," *Angew, Chem Int. Ed.* vol. No. 37, pp. 550-575 (1998).
(Continued)

*Primary Examiner*—Loha Ben
(74) *Attorney, Agent, or Firm*—Occhiuti Rohlicek & Tsao LLP

(57) ABSTRACT

A pattern (P) is transferred onto an optical article (1) in the form of one or more portions of a transferable material (3, 4b) retained by a layer of latex (2). The portion or portions of transferable material are applied with a stamp after the layer of latex has been formed on the article and before the latex is dry. By using latex as the adhesive material, the nature of the transferable material may vary widely. Such a method is particularly suitable for producing patterns such as holograms on optical lenses, especially ophthalmic lenses. The layer of latex may also protect the product against shocks which may subsequently be received.

39 Claims, 2 Drawing Sheets

U.S. PATENT DOCUMENTS

| | | | | |
|---|---|---|---|---|
| 5,110,707 | A | * | 5/1992 | Fujita et al. ............... 430/256 |
| 5,634,669 | A | | 6/1997 | Colgate, Jr. |
| 5,752,442 | A | * | 5/1998 | Johnson et al. ............ 101/211 |
| 5,772,905 | A | * | 6/1998 | Chou ............................ 216/44 |
| 5,817,242 | A | * | 10/1998 | Biebuyck et al. ............ 216/41 |
| 5,892,600 | A | | 4/1999 | Kuo |
| 5,937,758 | A | * | 8/1999 | Maracas et al. ............ 101/327 |
| 6,309,580 | B1 | * | 10/2001 | Chou ........................... 264/338 |
| 6,399,295 | B1 | * | 6/2002 | Kaylor et al. ................... 435/5 |
| 6,436,651 | B1 | * | 8/2002 | Everhart et al. ............ 435/7.21 |
| 6,579,673 | B2 | * | 6/2003 | McGrath et al. ................ 435/5 |
| 7,114,938 | B2 | * | 10/2006 | Chou ........................ 425/126.1 |
| 7,261,831 | B2 | * | 8/2007 | Sreenivasan ................. 216/44 |
| 7,670,127 | B2 | * | 3/2010 | Heidari ....................... 425/385 |
| 2004/0086709 | A1 | | 5/2004 | Hammond Cunningham et al. |
| 2004/0115279 | A1 | | 6/2004 | Hansford et al. |
| 2008/0164637 | A1 | * | 7/2008 | Chou ........................... 264/319 |
| 2008/0217813 | A1 | * | 9/2008 | Chou ........................... 264/293 |
| 2008/0289517 | A1 | * | 11/2008 | Begon et al. ................. 101/35 |

FOREIGN PATENT DOCUMENTS

| | | |
|---|---|---|
| DE | 19758395 | 7/1999 |
| DE | 19926698 | 12/2000 |
| DE | 10060531 | 6/2001 |
| EP | 0766103 | 4/1997 |
| EP | 1002640 | 5/2000 |
| EP | 1090971 | 4/2001 |
| FR | 2507196 | 12/1982 |
| JP | 4147180 | 5/1992 |
| JP | 7219435 | 8/1995 |
| WO | WO95/11945 | 5/1995 |
| WO | WO99/55790 | 11/1999 |
| WO | WO01/23921 | 4/2001 |
| WO | WO02/100656 | 12/2002 |
| WO | WO03/099953 | 12/2003 |

OTHER PUBLICATIONS

Schmid et al., "Preparation of Metallic Films on Elastomeric Stamps and their Application for Contact Processing and Contact Printing," *Advanced Functional Materials* vol. 13, No. 2, pp. 145-153 (2003).

Loo et al., "Additive, Nanoscale Patterning of Metal Films with a Stamp and a Surface Chemistry Mediated Transfer Process: Applications in Plastic Electronics," *Applied Physics Letters* vol. 81 No. 3 pp. 562-564 (2002).

Donald C. O'Shea, Thomas J Suleski, Alan D. Kathman, and Dennis W. Prather, *Diffractive Optics: Design, Fabrication, and Test;*, , p. 149-166 (2004).

Hans Peter Herzig, *Micro-Optics: Elements, Systems and Applications*; p. 153-177 (1997).

\* cited by examiner

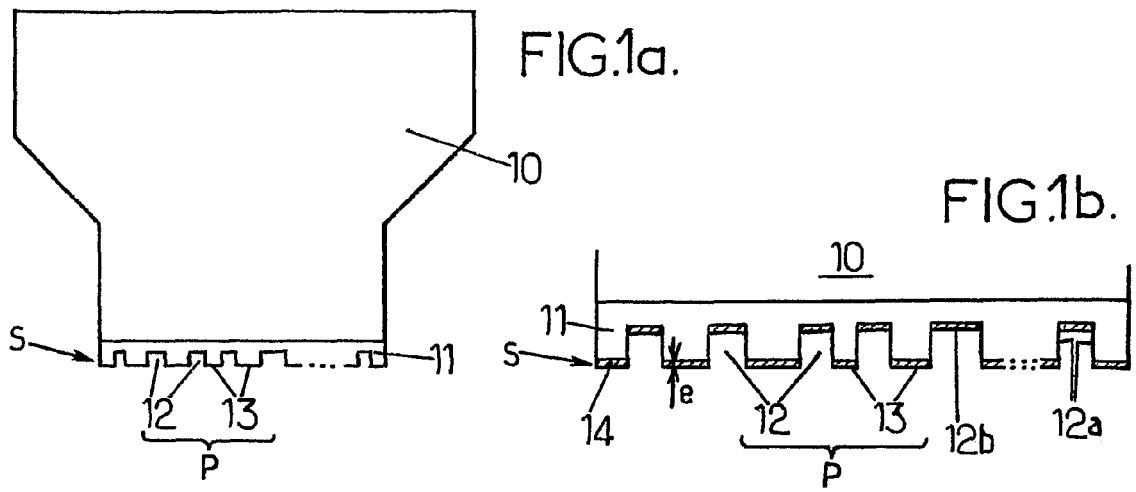
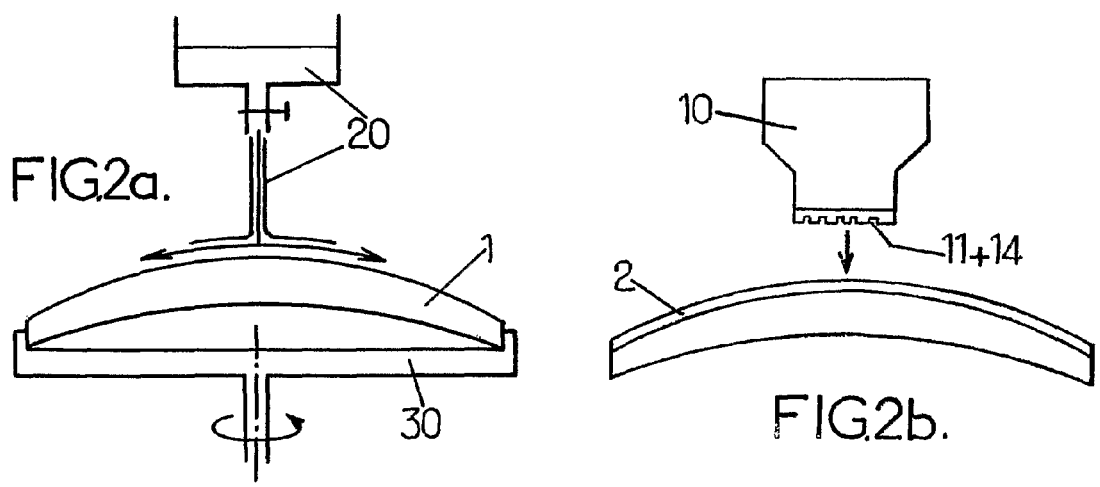
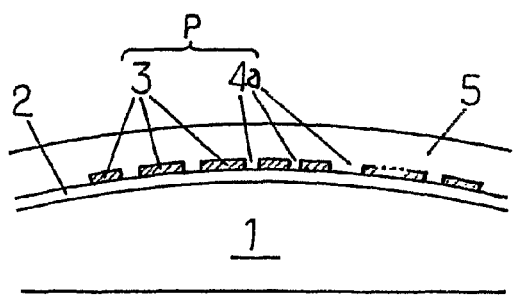 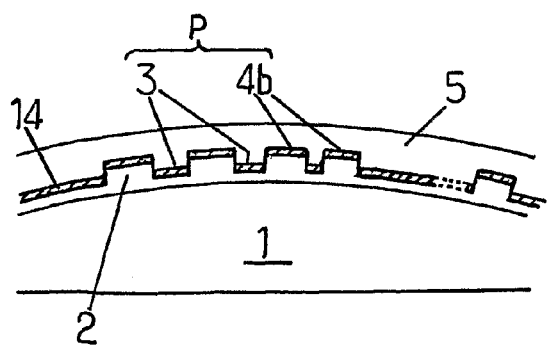

METHOD OF TRANSFERRING A MICRON-SCALE PATTERN ONTO AN OPTICAL ARTICLE, AND OPTICAL ARTICLE OBTAINED THEREBY

CROSS-REFERENCE TO RELATED APPLICATIONS

This application is the National Stage of International Application No. PCT/FR2006/002665, filed on Dec. 6, 2006, which claims the priority of French Application No. 0512492, filed on Dec. 8, 2005. The contents of both applications are hereby incorporated by reference in their entirety.

The present invention relates to a method of transferring a pattern of micron-scale dimensions onto an optical article, and to an optical article including such a pattern by using this method. It is particularly suitable for a product of the optical lens type, especially of the ophthalmic lens type. This method is highly advantageous for introducing a holographic pattern.

It may be necessary to print a predetermined pattern onto a product that is finished or in the course of manufacture, especially for the purposes of decoration, to display the logo of a product or to prevent possible counterfeiting of a product, for example.

To this end, a number of printing methods have been developed, generally designated as "soft" lithography methods as opposed to the lithographic methods conventionally employed for fabricating integrated electronic circuits. While those lithographic methods are based on selective irradiation and dissolution of portions of a resin mask in a predetermined pattern, soft lithography methods use a stamp having a surface that has micro-relief constituted by recesses and protuberances. This micro-relief defines the pattern to be reproduced on the product. The pattern is reproduced on a face of the product by applying the stamp to the face under conditions that are suited to the material present on the surface of the product.

The term "pattern" means the geometric arrangement of protruding surface portions brought into contact with the surface of the product when the stamp is applied.

In the soft lithography method known as "micro-contact printing", the face of the product is covered in a metallic layer and the stamp is coated with a substance that is capable of protecting the metallic layer during an etching step. During application of the stamp to the face of the product, some of the substance is selectively transferred from the stamp onto the metallic layer at locations that correspond to the protuberances of the stamp. The metallic layer is then etched at only those locations thereof that correspond to the recesses of the stamp. However, in order to obtain a satisfactory print quality, it is necessary to use a substance that forms a self-assembled molecular layer on the metallic layer. To this end, the metallic layer must be free of pollutants and must be constituted by a metal that is not prone to any chemical surface changes, such as oxidation. In practice, only gold, platinum, and silver can produce a print of satisfactory quality. Such a choice of materials for the constitution of the printed pattern is particularly narrow and may be incompatible with other constraints on the product, such as its cost price. Further, such a method is lengthy, in particular because of the step of etching the metallic layer, which step is generally carried out using a liquid solution of an etching agent.

Japanese patent document JP07-219435 describes a method of fabricating a hologram linker in which a hologram constituted by recesses and protuberances is initially etched in the surface of a thermoplastic material, and is then covered in a metallic layer. However, in such a process, it is difficult to limit the metallic layer to the portion of the surface that is occupied by the hologram.

One object of the present invention is to propose a method of transferring a pattern, which method is simple to carry out and compatible with the pattern being constituted by a large number of materials. In particular, the present invention should make it possible for an optical article to have transferred thereon a pattern with definition of micron scale or even of submicron scale, such a pattern advantageously constituting a hologram.

In general, in the context of the invention, the use of the term "micron-scale" encompasses both a micron-scale pattern with definition of micron scale and a submicron-scale pattern with definition on a scale that is smaller than that of micron scale, i.e. a hundred or fifty nanometers.

To this end, the invention proposes a method of transferring a micron-scale pattern as defined above onto a surface of an optical article, which method comprises the following steps:

a) depositing a layer of at least one transferable material on a surface of a stamp having recesses and protuberances constituting micro-relief with micron-scale or submicron-scale definition, corresponding to the pattern to be transferred;

b) depositing a layer of a latex in the liquid form on the surface of a substrate of the optical article;

c) before the layer of latex is dry, bringing the surface of the stamp that includes the layer of transferable material into contact with the layer of latex;

d) applying a pressure to the stamp; and e) removing the stamp from the surface of the optical article comprising the layer of latex.

According to the invention, the layer of transferable material deposited on the micro-relief of the stamp during step a) generally does not exactly conform to the profile of the micro-relief. The layer is preferentially present on the zones of the micro-relief that belong to planes that are orthogonal to the principal direction in which the material is deposited. These zones are carried by the protuberances (13) or recesses of the stamp (12*b*), as indicated in FIG. 1*b*.

A method in accordance with the invention is thus of the soft lithography type and for this reason exhibits specific advantages. In particular, the method does not include any etching steps since the portions of the layer of transferable material that are initially located in the recesses of the surface of the stamp are not brought into contact with the layer of latex that acts as an adhesive material, and for this reason they are not transferred to the surface of the latex. This method is precise and has the advantage of being non-polluting since no chemical etching step is required.

In the method of the invention, a layer of latex that is still partially liquid ensures adhesion to the surface of the optical article of portions of the layer of transferable material that are transferred during application of the stamp. Such an adhesion mechanism is compatible with a large number of transferable materials, especially electrically conductive materials, metallic materials, insulating materials, dielectric materials, or refringent materials. Further, the adhesion that is thus obtained is little affected by the pollutants present on the optical article or on the layer of transferable material.

One advantage of the invention resides in the conditions for bringing the stamp coated with at least one layer of transferable material onto the surface of the optical article coated with at least one layer of latex. These conditions relate essentially to the properties of the layer of latex, the application pressure of the stamp, and the duration of application. They can be controlled using simple and cheap means that are routinely available. The skilled person is aware of the conditions needed to produce a layer of latex with suitable properties. The conditions for bringing the stamp into contact with the surface of the optical article advantageously include carrying out the method of the invention under conditions such that the stamp is moved parallel to the normal to the point of contact on the optical article substrate.

The use of a latex in this type of method is of particular advantage since latex has an adhesive property that is merely transitional, during the drying phase. Thus, after carrying out the method, removal of the layer of latex deposited on the optical article from the zone carrying the pattern is not essential. The adhesive nature of the layer of latex disappears as it dries and the latex particles coalesce.

Further, using a latex in this type of method is also highly advantageous, since in one implementation of the invention, the latex is capable of reproducing specific micro-relief imposed by pressure from a master micro-relief.

As mentioned above, the pattern may be micron-scale or submicron-scale, the term "micron-scale" being used in a general manner in the whole of the description to designate these two pattern dimensions. Thus in a general manner in the context of the invention, the term "micron-scale pattern" means a pattern comprising one or more individual patterns; each individual pattern having a dimension in the range 10 μm [micrometer] to 50 nm [nanometer], advantageously in the range 5 μm to 100 nm, and highly advantageously in the range 3 μm to 150 nm.

In particular, the transferred pattern may be a diffracting pattern when it is illuminated by a beam of light. It may in particular be a holographic pattern. Such a pattern is particularly suitable for allowing identification of a product and/or to distinguish an original product from a counterfeit product. More particularly, the method of the invention is particularly suitable for introducing an amplitude hologram onto the optical article. The term "amplitude hologram" means a holographic microstructure that preferentially affects the amplitude of a normally incident electromagnetic field. This applies in particular for a hologram composed of an arrangement of transparent zones and opaque zones, which opaque zones are also reflective when the opacity is produced by using a metal. A reading image corresponding to the hologram may then be viewed by transmitting or reflecting a beam of light through or onto the lens.

The transferred pattern of the invention is also suitable for introducing a phase hologram onto the optical article. The term "phase hologram" means a holographic microstructure that preferentially affects the phase of a normally incident electromagnetic field.

The pattern itself may also represent a logo or an inscription that can be read directly from the optical article. When the pattern is constituted by a plurality of identical individual patterns, it may be both holographic in type and capable of being read directly from the optical article.

The holographic pattern may also be of the digital hologram type, i.e. a hologram generated by computer (often abbreviated as "CGH", "computer generated hologram"). Such a holographic pattern may be constituted by a set of contiguous pixels, each pixel having a surface area in the range 0.2 μm² [square micrometer] to 25 μm², advantageously in the range 0.2 μm² to 4 μm². Preferably, the pattern comprises a large number of pixels, for example a total of more than 10000 pixels, thus meaning that an image with sufficient resolution can be produced by reconstruction under illumination.

The transferred pattern may occupy a small portion of a face of the article, in particular so that it does not itself mask said article or interfere with subsequent use of the article. In such a configuration, the pattern preferably occupies a portion of the face of the article of less than 25 mm² [square millimeter].

Alternatively, the transferred pattern may occupy substantially all of one face of the article, especially when it comprises an array of micron-scale or submicron-scale wires. Such a pattern occupying the entire face of the article may be produced to obtain an antistatic function at the surface of the optical article, to produce a set of electrodes in a matrix display or a polarizing filter function for light reflected or transmitted by the optical article. For a polarizing filter, the polarizing effect is obtained by transferring a pattern of parallel conductive wires (wire grid type polarizer).

Advantageously, surface treatment of the optical article may be carried out before placing the layer of latex on the surface of said optical article. This treatment is in particular selected from chemical, thermal, plasma, and coronal treatment. This surface treatment may in particular comprise chemical treatment consisting of cleaning the surface of the optical article with isopropanol and/or water. Thus, any dust or dirt that may be present on this surface can be removed.

In the context of the invention, the layer of latex may be deposited by a spin-coating method, which method is well known especially in ophthalmic lens production lines. It may also be deposited using other deposition techniques such as dip-coating, spraying or using a jet of a substance through the nozzles of an inkjet printing head. The thickness of the layer of latex deposited on the surface of the optical article is generally in the range 0.2 μm to 50 μm, advantageously in the range 1 μm to 10 μm. The layer must be optically transparent. Its transmittance may be variable, especially with a tinted layer, but it must neither diffuse nor diffract nor modify the perception of an object observed by transparency through the optical article comprising such a layer of adhesive material.

The method may also include the following step that is carried out after step a) and/or step e):

f) covering the surface of the optical article with one or more functionalized coatings.

These functionalized coatings may be deposited in the form of a film or a mono- or multi-layered lacquer, using any deposition means such as dip-coating, spin-coating, spraying, or printing with a jet of a substance passed through the nozzles of an inkjet printing head. They are advantageously selected from coatings with an anti-shock, anti-abrasion, anti-reflective, soil-repellent, anti-fogging, antistatic, polarizing, coloring, and photochromic type function.

In accordance with a preferred implementation of the invention, the method then includes a additional step that is carried out after step e) and that consists in covering the surface of the optical article in at least one functionalized coating over the transferred pattern and the layer of latex. This coating, in addition to its functionalization, advantageously constitutes a protective coating for the transferred pattern.

The transferable material may be a metallic material such as gold, aluminum, chromium, silver, copper, nickel, platinum, palladium, or an alloy comprising at least one of said metals, for example. The layer of transferable material may then advantageously be deposited in step a) onto the surface of the stamp by vacuum evaporation or by vacuum cathodic sputtering. In general, it has been shown that the shorter the period between depositing the metallic layer on the stamp and carrying out step c), the better the transfer of said metallic layer onto the latex. This can be explained by the fact that the metallic layer is not contaminated; contamination would compromise the quality of the adhesion.

Alternatively, the layer of transferable material may comprise a stack of a plurality of respective layers of materials.

The material of at least one of the layers of the stack may then be refringent. The transferred pattern may then also be viewed partially as a result from interference with a light beam used to illuminate the pattern. Depending on the thickness of said stack, transfer of a stack of a plurality of layers of material may thus lead to a hologram being produced that would substantially affect the phase of a normally incident electromagnetic field. Such a transfer could thus approximate the conditions for producing a phase hologram. The term "phase hologram" means a holographic microstructure that preferentially affects the phase of a normally incident electromagnetic field.

In a first implementation of the invention, the surface of the stamp is applied against the surface of the optical article that carries the layer of latex, in step c), under suitable conditions so that the portions of the layer of transferable material that are located on the protuberances of the surface of the stamp are selectively transferred onto the surface of the optical article. In accordance with this first implementation, the portions of the layer of transferable material that are located in the recesses of the stamp are not transferred onto the surface of the optical article during application of the stamp as the recesses of the micro-relief are not brought into contact with the layer of latex. To accomplish this, the stamp is applied in step c) with a moderate pressure, so that the protuberances of the stamp do not penetrate into the layer of latex. The thickness of the layer of latex thus remains substantially constant over the face of the optical article, at least in the portion of that face that is occupied by the transferred pattern. The contrast of the transferred pattern thus results from the presence or absence of transferable material on the surface of the article, at different locations of the pattern. The transferred pattern then forms a juxtaposition of opaque and transparent zones, and if this pattern forms a diffractive holographic structure, the result is an amplitude hologram. In this implementation of the invention, the combination of selective transfer of the transferable material present on the protuberances onto the optical article and the absence of penetration of latex into the recesses of the pattern allows an amplitude hologram to be formed.

In accordance with a second implementation of the invention, the surface of the stamp is applied against the surface of the optical article that carries the layer of latex, in step c), under conditions that are suitable for the surface protuberances of the stamp to penetrate completely into the layer of latex, so that the portions of the layer of the transferable material that are located on the surface protuberances of the stamp as well as those located in the recesses of the stamp are jointly transferred onto the surface of the optical article. Preferably, the surface of the stamp is applied for a suitable period, i.e. a suitable drying time, so that after removing the stamp, the layer of latex has permanent indentations created by the penetration of the stamp protuberances into the layer of latex. The layer of latex thus has micro-relief in its surface, which micro-relief is none other than the complement of the micro-relief carried by the stamp surface. In other words, the pattern is molded into the layer of latex. The micro-relief carried by the layer of latex is constituted by recesses and protuberances. The recesses and the protuberances are covered with portions of the transferred metallic layer. The contrast of the transferred pattern may then result, at least in part, from variations in the thickness of the layer of latex. When the transferred pattern is a holographic pattern, the micro-relief obtained may constitute a phase hologram. The term "phase hologram" means a holographic microstructure that preferentially affects the phase of a normally incident electromagnetic field.

The invention also proposes an optical article that comprises a pattern transferred onto a surface thereof using a method as described above. This optical article comprises an optical instrumentation lens, an optical viewing lens, a visor, or an ophthalmic lens, and in particular a lens that can be mounted in a frame for eyeglasses. Such a lens thus itself comprises:
- a base lens comprising at least one organic or mineral substrate;
- a dry layer of latex; and
- portions of a transferable material forming the transferred pattern, transferred by adhering to the base lens via the layer of latex.

In particular, the basic lens comprises an organic substrate. The term "substrate" means the transparent material constituting the base of the optical lens and more particularly the ophthalmic lens. This material acts as a support for the stack of one or more coatings, and participates in creating the corrective function of the lens when the lens is a corrective ophthalmic lens. When the optical article is an ophthalmic lens, suitable examples of substrates are polycarbonates; polyamides; polyimides; polysulfones; polyethylene terephthalate/polycarbonate copolymers; polyolefins, especially polynorbornenes; diethylene glycol bis(allylcarbonate) polymers and copolymers; (meth)acrylic polymers and copolymers, especially (meth)acrylic polymers and copolymers derived from bisphenol-A; thio(meth)acrylic polymers and copolymers; urethane and thiourethane polymers and copolymers; epoxy polymers and copolymers; and episulfide polymers and copolymers. In some cases, the substrate may be directly bulk tinted.

One or more coatings may optionally be present between the organic substrate and the layer of latex. In particular, these coatings may be functionalized coatings, as described above.

Given that the lens is essentially transparent, when the pattern is holographic in type, it may be adapted to form a reading image when a light beam is sent through the lens at the location of the pattern.

The layer of latex may also protect the lens against any shocks it subsequently receives. Advantageously, a layer of a radiation resistant material is also formed on the lens, over the layer of latex and the transferred pattern.

Other features and advantages of the present invention become apparent from the following description of two non-limiting implementations, made with reference to the accompanying drawings, in which:

FIGS. 1a and 1b are sectional views of a stamp used in a transfer method in accordance with the invention;

FIGS. 2a and 2b illustrate the subsequent steps of the method;

FIGS. 3 and 4 are sectional views of transferred patterns in accordance with two implementations of the invention.

For clarity, the dimensions of the various elements shown in the figures are not in proportion with the actual dimensions or ratios of dimensions. Further, the figures use identical reference numerals to indicate identical elements.

Figure 5:
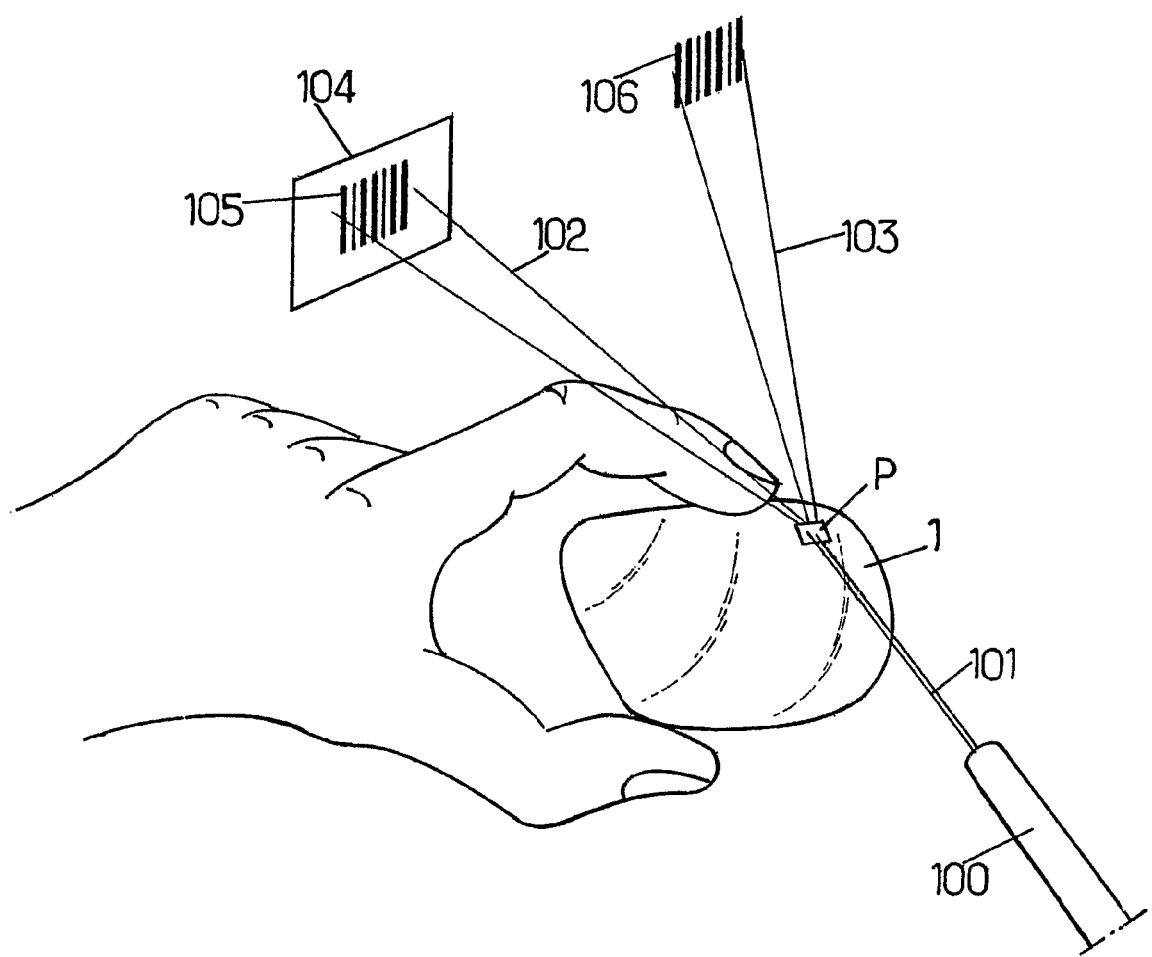
FIG. 5 shows a step of reading a holographic pattern that has been transferred in accordance with the invention.

The invention is described below in the context of transferring a holographic pattern onto an ophthalmic lens. In this description, the individual steps of the method of the invention that are individually known from existing methods are not described in detail. The present description concentrates on a succession of individual steps that allow the transfer of the invention to be accomplished.

In FIG. 1a, a stamp comprises a base 10 and a membrane 11. The membrane 11 has a surface S and is fixed to the base 10 by its face opposite to surface S. The surface S supporting the pattern comprises recesses 12 and protuberances 13 that correspond to two different values of the thickness of the membrane 11. The recesses 12 and the protuberances 13 form micro-relief of micron-scale dimensions, which defines the pattern denoted P. P designates the geometrical arrangement of protruding portions on the surface intended to be brought into contact with the surface of the optical article. The membrane 11 may be based on polydimethylsiloxane (PDMS), at least at the location of the protuberances 13 of the surface S of the stamp. Such a material has low surface energy, which encourages good transfer quality. This low surface energy of the constituent material of the membrane together with its soft nature characterized by its modulus of elasticity is an important condition since it guarantees perfect contact between the layer of latex and the transferable portions of material carried by the surface S of the stamp, and also guarantees that the transferable layer, in particular a metallic layer, can readily detach itself from the stamp to adhere to the adhesive layer. By way of indication, the commercially available PDMS known as Sylgard 184 (Dow Corning) has a modulus of elasticity of 2.5 MPa [megapascals]. Other materials, in particular of the elastomer type, may also be suitable for membrane 11. The recesses 12 and protuberances 13 may be formed in various manners. As an example, a liquid containing precursor monomers of the elastomer may be cast into a membrane mold provided with a pattern P, then polymerized inside the mold by heating or by irradiation with ultraviolet (UV) light. The membrane 11 obtained after unmolding is fixed onto the base 10. With such a membrane 11, the recesses 12 and the protuberances 13 may have dimensions in the range 10 µm to 50 nm, for example, measured parallel to the membrane 11. The depth of the recesses 12 may be 0.1 µm to 30 µm, advantageously 0.1 µm to 10 µm.

Advantageously, a layer that facilitates detachment of the metallic layer 14 from the membrane 11 may be deposited on the surface S before the layer of transferable material 14 is deposited.

The surface S may deform while being applied against the receiving layer, as a function of the curvature of that receiving layer. Said deformation may result from a crush of the membrane in a varying manner along the length of the surface S, and/or a push back of the membrane in a varying manner when it is fixed onto the base 10 in an appropriate manner.

FIG. 1b is an enlarged view of the membrane 11. A layer 14, for example formed of gold or aluminum, is deposited on the membrane 11 and is distributed over the zones of the micro-relief (12b and 13) that constitute planes orthogonal to the principal direction in which the material has been deposited. The layer 14 may have a thickness "e" of 30 nm, for example. It may be deposited on the surface S in a variety of manners, especially by vacuum evaporation of a quantity or gold or aluminum contained in a crucible and heated by the Joule effect.

In FIG. 2a, an ophthalmic lens that is initially constituted by a base lens 1 has a convex anterior face and a concave posterior face, for example. The pattern P is then transferred onto the anterior face of the lens, but it should be understood that a similar transfer could be made onto the posterior face. Thus, the invention is particularly adapted to transferring a pattern onto a pseudo-spherical surface. In the context of the invention, the term "pseudo-spherical" surface means a continuous concave or convex surface, i.e. free of holes or steps. In general, at least one of the two faces of an optical lens is pseudo-spherical, so that the resulting variation in thickness of the lens endows it with optical power. Afocal, single vision, bifocal, trifocal and progressive power ophthalmic lenses all have at least one pseudo-spherical face. A spherical surface corresponds to a special case of a pseudo-spherical surface where the radii of curvature of the surface in two perpendicular directions are equal. The expression "pseudo-spherical surface" when used below is intended to include the special case of spherical surfaces.

The ophthalmic lens 1 may be of any type as described above. The term "ophthalmic lens" means lenses that are suitable in particular for mounting in eyeglass frames and that function to protect the eye and/or to correct vision.

Preferably, the surface of the lens 1 that is intended to receive the pattern P is first cleaned. To this end, the lens may undergo coronal treatment or plasma treatment, but a cleaning method using one or more detergent and/or rinsing solutions may also be employed.

A layer of latex in liquid form is formed on the anterior face of the lens 1. Preferably, the layer of latex is deposited by spin-coating using a liquid solution of latex, with reference numeral 20. The lens 1 is placed horizontally on a support 30 and is rotated about a vertical axis. The liquid 20 is then dispensed onto the lens 1. In a manner that is known per se, the rate of rotation of the lens as the latex is spread determines the thickness of the layer of latex that is formed on the lens. The spreading time influences drying of the layer of latex. The layer of latex is given reference numeral 2 below.

By using a latex type material, the anterior face of the lens 1 that is covered with the layer 2 has temporary adhesive power so long as layer 2 is not definitively dry. This adhesive power results from the many pendent chemical bonds present in the liquid latex. Many latexes may be used to form the layer 2; examples that may be mentioned include polyurethane latexes, poly(meth)acrylate latexes, polyester latexes, and latexes including butadiene units such as polybutadienes or poly(styrene-butadiene) latexes. Latexes of these types are described in particular in U.S. Pat. Nos. 5,316,791, U.S. Pat. No. 6,503,631, and 6,489,028, which are incorporated herein by reference. It is also possible to use photochromic latexes such as those described in European patent EP-A-1 161 512 and French patent FR-A-2 811 322. Advantageously, acrylic latexes are used, such as that sold by Zeneca with trade name A-639, or polyurethane latexes sold by Baxenden with trade names W-240 and W-234.

The surface S of the stamp, and more specifically the protuberances 13 and recesses 12b that carry the metallic layer 14, is then applied against the anterior face of the lens 1 covered in the layer 2. To this end, the stamp is approached in a direction substantially perpendicular to the face of the lens (FIG. 2b). Application is accomplished with pressure sufficient to obtain good cohesion of the metallic layer 14 with the layer of latex 2, at the protuberances 13 of the surface S.

In a first implementation of the invention illustrated in FIG. 3, the application pressure of the stamp against the lens 1 is not too high in order to prevent the latex of the layer 2 from penetrating between the protuberances 13 during application. In other words, the protuberances 13 of the surface S do not penetrate into the layer 2. In this manner, only the portions of the metallic layer 14 that are initially located on the protuberances 13 come into contact with the layer of latex 2. When the stamp is removed, these portions of the layer 14, with reference numerals 3 in FIG. 3, remain selectively bonded to the lens 1 by the adhesive power of the latex that has not yet dried. They have shapes that reproduce those of the protuberances 13 of the surface S of the stamp, parallel to the surface of the lens, so that the pattern P is transferred onto the lens 1. The material of the layer 14 thus functions as a material for transferring the pattern P onto the lens 1. The portions of the layer 14 that are located in the recesses 12 of the surface S are removed with the stamp when the stamp is taken away from the lens 1, since they do not come into contact with the layer of latex 2. Gaps that are free of metallic material, with reference numerals 4a in FIG. 3, and that correspond to the recesses 12 of the surface S, thus separate the portions 3 on the anterior face of the lens 1. The inventors have shown that the pressures at which the stamp is applied to the lens 1, which pressures are in the range 0.1 gram per square millimeter ($g/mm^2$) to 60 $g/mm^2$ of surface of the protuberances on the pattern P, produce selective transfer qualities allowing an amplitude hologram to be produced. For such an implementation, the stamp is applied against the lens 1 when the layer of latex 2 has started to densify and dry partially, but before it has dried completely, so as to retain sufficient bonding power. As an example, the stamp may be applied against the lens ten seconds after depositing the layer of latex by spin-coating, and for a period of two seconds. The portions of the material 3 that form the transferred pattern P are thus located at the same level on the layer of latex 2 in a direction perpendicular to that layer, and they are separated by gaps that are free of transferable material.

In a second implementation shown in FIG. 4, the application pressure of the stamp against the lens 1 is sufficient to cause latex of the layer 2 to penetrate into the recesses 12 between the protuberances 13. The protuberances 13 of the surface S thus penetrate into the layer 2. In this manner, all portions of the transferable material of the metallic layer 14 come into contact with the layer of latex 2 so that, when the stamp is removed, all portions of the layer 14 remain completely bonded to the layer 2, i.e. both the layer of transferable material present on the protuberances and the layer of transferable material present in portion 12b of the recesses. Penetration of the protuberances 13 into the layer 2 creates micro-relief therein by molding or embossing. The pattern that is transferred onto the lens 1 is thus constituted by several portions of transferable material of the layer 14 that are located at different depths of the micro-relief molding in the layer of latex 2. In FIG. 4, the portions with reference numerals 3 and 4b respectively correspond to the protuberances 13 and recesses 12 of the surface S of the stamp. The inventors have shown that the application pressure of the stamp on the lens 1 may be greater than 60 $g/mm^2$ when the stamp is applied against the lens 1 ten seconds following deposition of the layer 2 by spin-coating, with application being for two seconds. The surface area used to calculate the pressure is that of the protuberances 13 constituting the pattern P.

Once the layer of latex 2 has dried completely, it loses its adhesive characteristics and all portions of the anterior face of the lens 1 can be touched without adhering. Simultaneously, the layer 2 definitively fixes portions 3 of transferable material (deriving from the zones 13) or all portions of the transferred layer 14 deriving from the protuberances 13 and the recesses 12b thereby constituting the transferred pattern P.

Particularly advantageously, the layer of latex 2 also provides the lens 1 with protection against shocks. In fact, a layer of latex can damp a shock applied to a surface. Thus, the layer 2 may have two functions in the context of the invention: in addition to fixing portions of transferable material to the lens, it also protects it against possible shocks.

An upper layer 5 may also be applied to the anterior face of the lens 1. In particular, this layer 5 covers the transferred layer P. It may be formed of a solution of precursors deposited on the layer of latex 2 and on the portions 3 of transferred material that form the pattern P (FIG. 3) or on all portions of the transferred layer 14 covering the micro-relief molded in the latex (FIG. 4). Such an upper layer 5 may also have an optical function such as, for example, a function of polarizing, absorbing, coloring, or filtering light passing through the lens 1.

When the transferred pattern constitutes a diffractive holographic structure, a reading image diffracted by the hologram and reconstituting the information that it contains may be viewed by transmission or reflection of a coherent beam of light on the lens 1, at the location of the transferable pattern P. To this end, and in accordance with FIG. 5, the holographic pattern P is illuminated by a low power laser pen 100, for example red with a wavelength of 645 nm. In a known manner, the distance between the laser pen 100 and the pattern P is not critical to reconstruction of the image. The light beam 101 from the laser pen 100 is diffracted by the pattern P, so that it is divided into at least two secondary beams 102 and 103 after passing through the lens 1. Each of the two beams 102 and 103 reconstructs an image at a distance from the lens 1, which distance may be in the range 20 centimeters (cm) to 50 cm, for example. This image is revealed by placing an object 104 to act as a screen in the path of one of the two beams 102 or 103. Because the light employed is from a laser, any object that acts as a screen may be used. Optionally, the image may also be projected onto an image sensor, for example of the CCD (charge coupled device) or CMOS (complementary metal oxide semiconductor) type, to provide rapid and accurate recognition. In FIG. 5, the images that correspond to each of the two beams 102 and 103 have reference numerals 105 and 106 respectively. They correspond to two opposite orders of diffraction, for example +1 and −1, so that the two images 105 and 106 are inverted relative to each other. The image that is not inverted, or the "direct image", corresponds to diffraction order +1 and is the reading image of the holographic pattern P.

The ophthalmic lens 1 may be intended for mounting in a frame for eyeglasses. In order not to interfere with the vision of the wearer of the eyeglasses, the dimensions of the pattern P may be small and printed close to an edge of the lens 1 (FIG. 5). As an example, the transferred pattern P may occupy a portion of the face of the lens 1 of less than 25 $mm^2$. The pattern may also be introduced onto a portion of the lens that is intended to be cut off. Under such circumstances, the pattern is introduced mainly with the aim of traceability for the final product. Such a configuration is of particular interest if the transferred pattern corresponds to a hologram generated by a CGH type computer and constituted by pixels. Such a hologram may thus contain a very large amount of information on a very small area, advantageously in the range 15 $mm^2$ to 0.5 $mm^2$, which can, for example, guarantee complete traceability of the optical article in the production and logistics lines.

Alternatively, the transferred pattern P may occupy the entire anterior face of the lens 1, for example when it endows the lens with a particular optical function. This may apply in particular when the transferred pattern P is constituted by a set of electrically conductive wires that are parallel to a predetermined direction, to filter light passing through the lens as a function of polarization of the light. Typically, the conductive wires are a few tens of nanometers wide and they are spaced apart by a few tens of nanometers.

Many modifications may be introduced to the transfer method as described above in detail, while still retaining at least some of the advantages of the invention. As an example, an intermediate layer may be deposited on the membrane 11 of the stamp prior to the layer of transferable material 14, to adjust the surface energy between the layer 14 and the membrane 11 of the stamp. Such an adjustment may further improve transfer of portions 3 of transferable material onto the lens 1. Further, the pattern transferred onto the lens may be a diffracting pattern, i.e. with visibility that results from diffraction of light by the portions 3 and/or the spaces 4 present between them. Finally, the transferred pattern may be visible under ambient lighting conditions, or when it is illuminated by a laser beam.

EXAMPLE

1. Layer of Latex (2)

The key parameter of the method is the state of the layer of latex when step c) is carried out: i.e. bringing the surface of the stamp that includes the layer of transferable material into contact with the layer of latex.

During this step, the layer of latex must not be dry, so that it is:
- adhesive, to allow transfer of the adhesive layer;
- deformable, to allow the latex to deform definitively, so as to reconstitute micro-relief constituted by recesses and protuberances; which micro-relief is complementary to the micro-relief constituting the pattern P on the surface of the stamp.

The term latex A is used for an aqueous solution of W234 polyurethane latex from Baxenden with the following properties, measured at 21.6° C. and 44% relative humidity:
- viscosity: 7 centipoise (cP);
- dry extract: 22.25%.

A layer of latex A with a thickness of 1 μm was deposited by spin-coating onto the convex face of an ophthalmic lens based on Orma® (Essilor) with a radius of curvature of 120 millimeters (mm), under the following conditions:
Conditions for depositing a layer that is not dry (at 21.6° C. and 44% relative humidity):
- dispense 2.5 milliliters (ml) of latex onto lens;
- rotate lens at 2000 revolutions per minute (rpm) for 15 seconds (s);
- rotate lens at 2500 rpm for 2 s.

The deposited layer of latex retained its properties for about ten seconds, which period defines the window in the method during which the transfer must be carried out.

2. Pattern to be Transferred (3)

The method given as an example was optimized for a digital holographic pattern composed of square individual pixels each with a side of 1 μm.

To this end, the membrane 11 of the stamp carried at its surface micro-relief consisting of recesses 12 and protuberances 13 with a rectangular profile as shown diagrammatically in FIG. 1a. The depth of the micro-relief (difference in height between the recesses 12b and the protuberances 13) was 1 μm.

The characteristics of the holographic pattern were such that the width of the protuberances of the micro-relief carried by the membrane 11, measured along an axis parallel to an edge of the square pixels, was in the range 1 μm and 85 μm depending on the zone of the stamp under consideration.

3. Stamp Carrying the Pattern (FIG. 1a)

The pattern to be transferred was molded in Sylgard® 184 (11) (Dow Corning). The properties of this material after polymerization at 100° C. for 1 hour were as follows:
- surface energy: 22 millinewtons per meter (mN/m);
- Young's modulus: 2.5 MPa.

4. Metallic Layer (14)

The metallic layer was obtained by vacuum evaporation. The suitable metallic material was placed in a crucible, and heated using the Joule effect. Evaporation was carried out onto the Sylgard® 184 stamp which had not undergone any initial surface preparation.

With gold: a 30 nm thick layer was obtained by evaporating gold with a purity of 99.9%.

With aluminum: a 30 nm thick layer was obtained by evaporating aluminum granules with a purity of 99.5%.

The metallic layer was evaporated on the same day as it was transferred onto the ophthalmic lens.

5. Transfer (FIG. 2b)

In the first implementation of the invention: transfer of the layer 14 was performed selectively; only those portions of material that were initially located on the protuberances (13) of the stamp were transferred. The transferred holographic pattern was of the amplitude hologram type.

In the second implementation of the invention: the surface protuberances of the stamp could penetrate completely into the layer of latex. The entire layer 14 was transferred: all portions of the transferable layer 14 present on the protuberances 13 and the recesses 12b were transferred. Transfer of all of the portions of the layer 14 was accompanied by permanent indentation of the layer of latex, reproducing micro-relief complementary to the micro-relief constituting the pattern P of the stamp. The transferred holographic pattern was of the phase hologram type, covered in a metallic layer.

The stamp was applied orthogonally to the surface.

The result of the transfer depends on the pressure at which the stamp is applied, and thus on the implementation of the invention:

If this pressure is below a pressure $P_{limit}$: transfer is selective; this is in accordance with the first implementation of the invention: amplitude hologram.

If this pressure is above a pressure $P_{limit}$: entire transfer occurs, accompanied by permanent indentation of the layer of latex, reproducing micro-relief that is complementary to the micro-relief constituting the pattern P on the stamp.

This pressure $P_{limit}$ was determined for a 30 nm layer of gold or aluminum on the latex deposited under the conditions described above.

$P_{limit}$ was 45 g/mm$^2$ to 60 g/mm$^2$ of the surface of the protuberances 13 of the stamp constituting the pattern P.

The table below shows the results of the various test conditions:

| Pressure applied to stamp | Result |
| --- | --- |
| 6 g/mm$^2$ | Perfectly selective |
| 40 g/mm$^2$ | transfer. |
| | Amplitude hologram. |
| Selective transfer limit: $P_{limit}$ = 45 g/mm$^2$-60 g/mm$^2$ | |
| 67 g/mm$^2$ | Transfer in entirety with permanent indentation of layer of latex. Phase hologram. |

Pressures Applied for Selective Gold Transfer Example:

The pressure with which the stamp was applied to the convex surface of an ophthalmic lens (with a radius of curvature of 120 mm) covered in a layer of latex deposited under the conditions described above, was 1.5 g/mm$^2$. Transfer of the 30 nm gold layer was selective: the hologram obtained was an amplitude hologram.

Pressures Applied for the Integral Aluminum Transfer Example with permanent indentation of the layer of latex A, producing a negative of the recesses 12 and protuberances 13 of the stamp, constituting the pattern P:

The pressure with which the stamp was applied to the convex face of an ophthalmic lens (with a radius of curvature of 120 mm) covered with a layer of latex deposited under the conditions described above was 1.5 g/mm$^2$. The entire 30 nm layer of aluminum was transferred, and the layer of latex was definitively indented such that the micro-relief of the layer of latex was the complementary micro-relief of the micro-relief constituting the pattern P on the surface of the stamp. The hologram obtained was a phase hologram.

The invention claimed is:

1. A method of transferring a micron-scale pattern onto a surface of an optical article, the method comprising the following steps:
    a) depositing a layer of at least one transferable material on a surface of a stamp having recesses and protuberances constituting micro-relief with micron-scale or submicron-scale definition, corresponding to the pattern to be transferred;
    b) depositing a layer of a latex in the liquid form on the surface of the optical article;
    c) before the layer of latex is dry, bringing the surface of the stamp that includes the layer of transferable material into contact with the layer of latex;
    d) applying a pressure to the stamp; and
    e) removing the stamp from the surface of the optical article comprising the layer of latex.

2. Method according to claim 1, in which the micron-scale pattern comprises one or more individual patterns, each individual pattern having a dimension in the range 10 µm to 50 nm.

3. Method according to claim 1, in which the dimensions of the recesses and the protuberances are in the range 10 micrometers to 50 micrometers, measured parallel to the surface of the stamp.

4. Method according to claim 1, in which the depth of the recesses is in the range 0.1 µm to 30 µm.

5. Method according to claim 1, in which the transferred pattern is a diffracting pattern when said pattern is illuminated by a beam of light.

6. Method according to claim 1, in which the transferred pattern is a holographic pattern.

7. Method according to claim 6, in which the transferred pattern is an amplitude hologram type holographic pattern.

8. Method according to claim 7, in which in step c) the surface of the stamp is applied against the surface of the optical article carrying the layer of latex under conditions such that the layer of transferable material located on the protuberances of the surface of the stamp is selectively transferred onto the surface of said optical article.

9. Method according to claim 8, in which in step c) the surface of the stamp is applied against the surface of the optical article carrying the layer of latex with pressure in the range 0.1 g/mm$^2$ to 60 g/mm$^2$ of surface of the protuberances of pattern P.

10. Method according to claim 6, in which the transferred pattern is a phase hologram type holographic pattern.

11. Method according to claim 10, in which in step c) the surface of the stamp is applied against the surface of the optical article carrying the layer of latex under conditions such that the protuberances on the surface of the stamp penetrate completely into the layer of latex, and such that the portions of the layer of transferable material that are located on the protuberances on the surface of the stamp as well as those located in the recesses of the stamp are jointly transferred onto the surface of said optical article.

12. Method according to claim 11, in which in step c) the surface of the stamp is applied against the surface of the optical article carrying the layer of latex at a pressure of more than 60 g/mm$^2$ of the surface of the protuberances of pattern P.

13. Method according to claim 6, in which the transferred pattern is a digital hologram type holographic pattern constituted by a set of contiguous pixels, each pixel having a surface area in the range 0.2 µm$^2$ to 25 µm$^2$.

14. Method according to claim 1, in which the transferred pattern occupies a small portion of a face of the optical article.

15. Method according to claim 14, in which the transferred pattern occupies a portion of the face of the optical article of less than 25 mm$^2$.

16. Method according to claim 1, in which the transferred pattern occupies the entire face of the optical article.

17. Method according to claim 16, in which the transferred pattern comprises an array of parallel electrically conductive wires.

18. Method according to claim 1, in which the micron-scale pattern is adapted to form a reading image when a beam of light is passed through the optical article at a location of said pattern.

19. Method according to claim 1, in which the layer of latex is deposited on the surface of the optical article using a spin-coating method.

20. Method according to claim 19, in which the thickness of the layer of latex is in the range 0.2 µm to 50 µm.

21. Method according to claim 1, further comprising the following step, carried out after step a) and/or step e):
    f) covering the surface of the optical article with one or more functionalized coatings.

22. Method according to claim 21, in which said one or more functionalized coatings comprise an anti-shock function, an anti-abrasion function, an antireflective function, a soil-repellent function, an anti-fogging function, an antistatic function, a polarizing function, a coloring function, or a photochromic function.

23. Method according to claim 21, in which the additional step f) is carried out after step e).

24. Method according to claim 1, in which the transferable material is a metallic material.

25. Method according to claim 24, in which the transferable material is a metal selected from gold, aluminum, chromium, silver, copper, nickel, platinum, palladium, and an alloy comprising at least one of said metals.

26. Method according to claim 24, in which the layer of transferable material is deposited in step a) onto the surface of the stamp by vacuum evaporation or vacuum cathodic sputtering.

27. Method according to claim 24, in which the layer of transferable material comprises a stack of a plurality of respective layers of materials.

28. Method according to claim 27, in which the material of at least one of the layers of the stack is refringent.

29. Method according to claim 1, in which the stamp is based on polydimethylsiloxane at least at the locations of the protuberances of the surface of the stamp.

30. Method according to claim 1, in which the stamp is approached parallel to the normal from a point of contact of the stamp surface with the optical article.

31. Method according to claim 1, in which in step c) the surface of the stamp is adapted to deform during application against the surface of the optical article as a function of a curvature of said optical article surface.

32. Method according to claim 1, further comprising a step of processing the surface of the optical article carried out before step b).

33. Method according to claim 1, in which the optical article is selected from an instrumentation optical lens, a viewing lens, a visor, and an ophthalmic lens.

34. Method according to claim 33, in which the optical article is an ophthalmic lens selected from afocal, single vision, bifocal, trifocal, and progressive power lenses.

35. An optical article comprising at least one transferred pattern on the surface of said optical article, transfer of said pattern being achieved by a method according to any one of the preceding claims.

36. Article according to claim 35, representing an ophthalmic lens, said lens itself comprising:
   a base lens comprising at least one organic or mineral substrate;
   a dried layer of latex; and
   portions of a transferable material forming the transferred pattern, by adhesion to the base lens via a layer of adhesive material.

37. Article according to claim 36, in which the pattern is formed by several portions of printing material located at the same level on the layer of latex in a direction perpendicular to said layer and separated by gaps that are free of transferred material.

38. Article according to claim 36, in which the pattern is embossed into the layer of latex and in which several portions of transferred material are located at different engraving depths into the layer of latex.

39. Article according to claim 36, in which the layer of latex further forms a protection for the lens against shocks which may subsequently be received by said lens.

* * * * *